Figure 1:
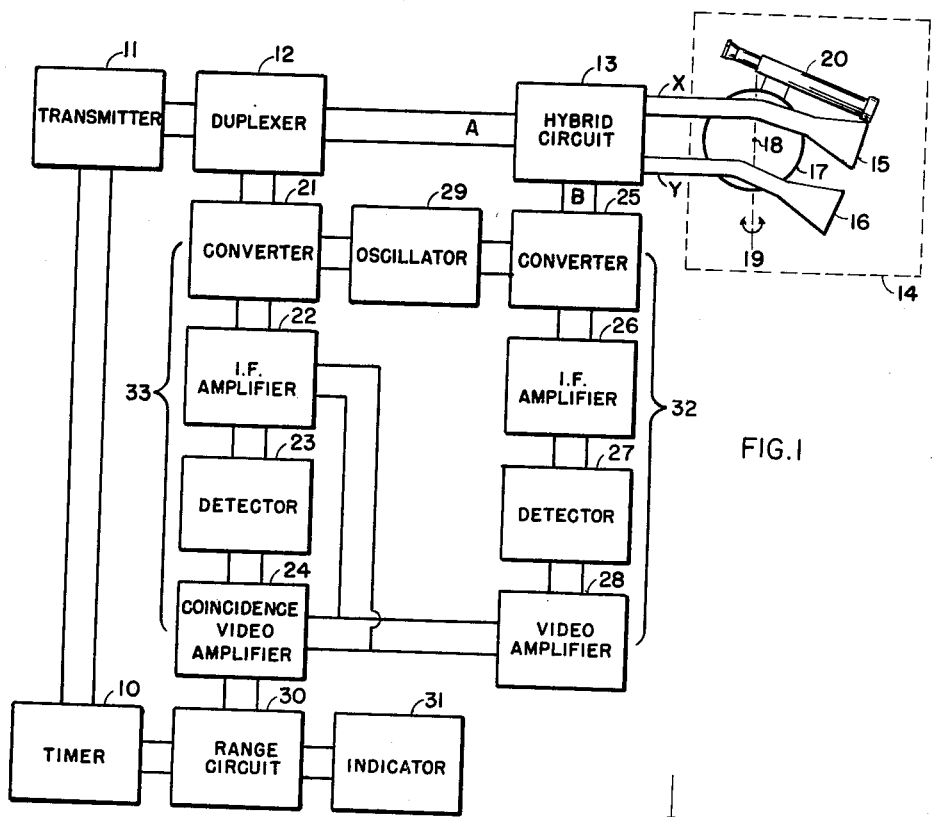

Aug. 24, 1954

N. S. FOX ET AL 2,687,520

RADAR RANGE MEASURING SYSTEM

Filed March 28, 1950

2 Sheets-Sheet 1

INVENTOR.
NELSON S. FOX
WILLIAM P. GOLDBERG
BY
Harry M. Saragovitz
Attorney

Aug. 24, 1954     N. S. FOX ET AL     2,687,520
RADAR RANGE MEASURING SYSTEM
Filed March 28, 1950     2 Sheets-Sheet 2

INVENTOR.
NELSON S. FOX
WILLIAM P. GOLDBERG
BY
Harry M. Saragovitz
Attorney

Patented Aug. 24, 1954

2,687,520

UNITED STATES PATENT OFFICE 2,687,520

RADAR RANGE MEASURING SYSTEM

Nelson S. Fox, Metedeconk, and William P. Goldberg, Long Branch, N. J., assignors to the United States of America as represented by the Secretary of the Army Application March 28, 1950, Serial No. 152,436

1 Claim. (Cl. 343—13)

(Granted under Title 35, U. S. Code (1952), sec. 266)

The invention described herein may be manufactured and used by or for the Government for governmental purposes, without the payment of any royalty thereon.

This invention relates to a range finder of the radar echo type. In particular the invention relates to a radar system for measuring range to a target which can be sighted upon optically.

The service in which such a range finder is desirable is military where the equipment must be rugged and portable. In particular the range finder of this invention is suitable for use with Army tank artillery.

The usual method of determining range to a viewable target has been to employ optical range finders. For accurate ranging optical range finders depend upon viewing the target from two spaced positions and determining the range by triangulation. For distances of two to three miles which are here contemplated, the distance between the two viewing points must be substantial if accuracy is to be achieved. Such range finders are not generally suitable in the service contemplated because of this spaced viewing requirement. Other optical range finders which do not employ two points of view have insufficient accuracy for the purpose. In addition, optical range finders are delicate and are not easily maintained in good adjustment, particularly in use from tanks where the system of the present invention may be employed. It is therefore desirable to range directly by means of radar wherein the time of travel of the transmitted pulse of wave energy to the target and the return of the echo response is measured to determine range.

The use of radar to determine range and location of target by means of echo response time measurements is, of course, well known. In ordinary radar practice, however, a discrete target returns an echo response signal which is distinguishable from the echoes returned by nearby targets. In the service contemplated, however, it frequently happens that a target sighted on the ground or on a hillside does not return a radar echo which is distinguishable from the clutter echo response of the surrounding area. For example, in military operations an object may be distinguishable by sight because of its color or some suspicious viewable difference in the landscape. When, however, a radar system of the prior art type is oriented to transmit wave energy pulses in the direction of this object as a target no particular distinguishing echo may be returned and therefore the display scope response shows no particular echo which may be measured to determine range.

If the radar is extremely directive, that is, has a highly directive lobe, the radar antenna can be sighted in the direction of this viewable target and the time of echo return from the target measured to determine the range. However, for distances of the order of two to three miles, it is presently impossible to produce a directive beam which is sufficiently narrow so that this procedure may be employed. The present invention therefore employs a system of simultaneous lobing wherein a pair of narrow conical directive patterns of wave energy overlap in elevation to define a line of sight which may be directed at the target and the echo energy received in the two overlapping directional patterns or lobes are effectively subtracted to determine the range.

It is accordingly an object of the present invention to provide a range measuring system employing radar which substantially avoids one or more of the limitations of the prior art.

It is an object of the present invention to provide a new and improved radar system for measuring range to a sighted target which target ordinarily has no radar echo response distinguishable over the clutter echo response of the area in which the target is located.

It is a further object of the present invention to provide a radar system for measuring range to a sighted target having no echo response distinguishable over the clutter echo response of the area in which the target is located and which employs a pair of overlapping directional patterns for determining the range.

In accordance with the invention a radar system for measuring range to a sighted target is provided for the case where the target has no radar echo response distinguishable over the clutter echo response of the area of the target location and which comprises an antenna structure adjustable in direction. The structure comprises means for transmitting and receiving wave energy in a pair of narrow conical directional patterns overlapping in elevation to define a sight direction wherein the amplitudes of the two patterns are equal. Means are provided for aiming the antenna structure to cause the sight direction to intersect the target. Also provided are means for simultaneously transmitting in each of the two patterns pulses of in-phase wave energy of a chosen frequency. Further means are provided for receiving in said patterns echo return wave energy pulses in time displacement corresponding to the range displacement of the points of their origin and means for combining the energy received in each of the patterns additively in one channel to provide a signal and subtractively in another channel to provide a control potential. Also provided are means for utilizing the control potential inversely to vary the amplitude of the signal effectively to translate an echo from only the sighted target and means for utilizing said translated echo to determine the range of the target.

For a better understanding of the present invention, together with other and further objects thereof, reference is had to the following description taken in connection with the accompanying drawings, and its scope will be pointed out in the appended claim.

Figure 3:
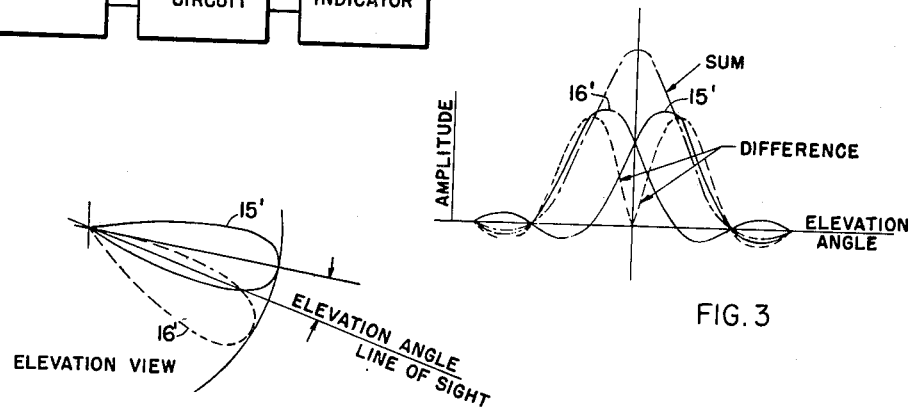
Figure 2:
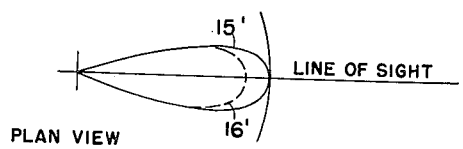
Figure 4:
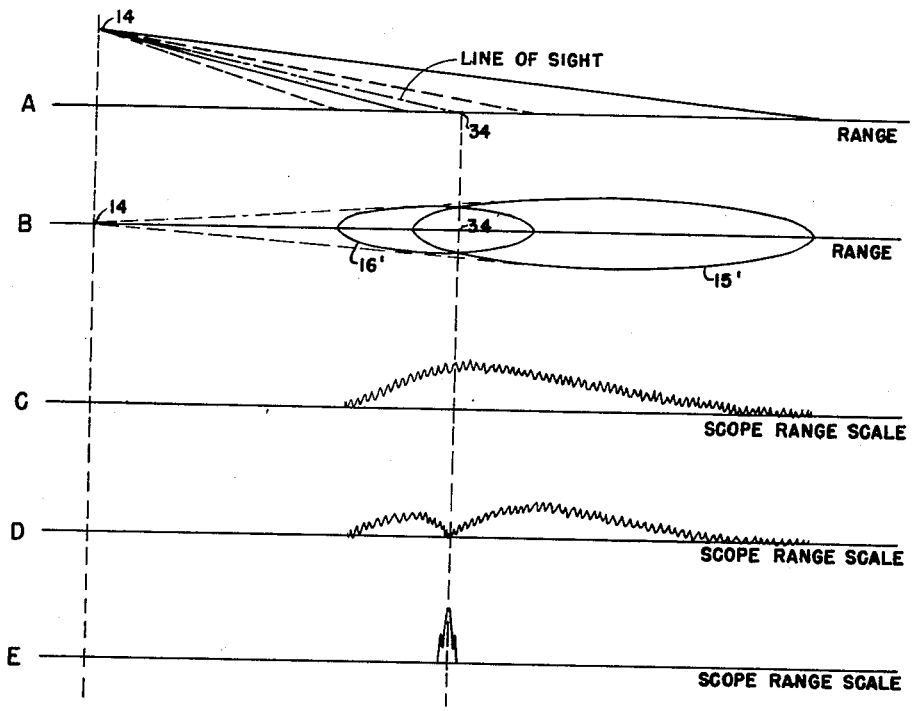
Figure 5:
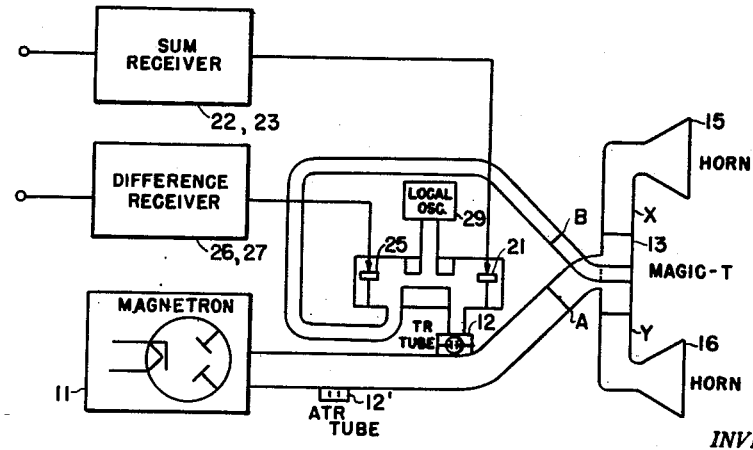

In the drawings, Fig. 1 is a block diagram illustrating a preferred embodiment of the radar system of the present invention; Fig. 2 is a diagram showing in both elevation and plan view the overlapping directional patterns of the antenna structure; Fig. 3 is a graph showing the directional pattern of the antenna structure in rectangular coordinates together with a plot of the patterns when added and when subtracted; Fig. 4 is a series of graphs which illustrate the operation of the system; and Fig. 5 is a diagram partly schematic corresponding to a part of Fig. 1 and showing a preferred embodiment of the system as arranged for microwave operation.

Referring now to Fig. 1 there is shown in block diagram the several units of a radar system for ranging in accordance with the present invention. Unit 10 is a timer for determining a pulse repetition rate and is coupled to pulse transmitter 11 and to range circuit 30. Transmitter 11 is preferably a generator of microwave energy of a chosen carrier frequency pulse modulated in synchronism with timer 10. The recurrent pulse output of transmitter 11 is coupled to the antenna structure 14 via a duplexer unit 12 and hybrid circuit 13. The duplexer 12 may be any one of a number of known arrangements ordinarily employed in radar, its purpose being to isolate the transmitter from the receiver so that the receiver is inoperative during the transmission of a pulse and vice-versa. The hybrid circuit 13 may be of any well known form, for example, in microwave operation it may be the wave guide structure familiarly known as the magic-T or it may be the ring type structure ordinarily referred to as the "rat-race". Both of these devices are described in U. S. Patent No. 2,445,895 issued on July 27, 1948 to W. A. Tyrrell. While this type of circuit is very well known, briefly it may be pointed out that it is characterized by having the four terminal positions labeled A, B, X and Y in the drawing. The terminal positions A and B are conjugate or balanced positions. Thus wave energy supplied to position A will not enter position B but will divide equally to supply in-phase energy at positions X and Y. Similarly wave energy supplied to position B will not enter position A but will divide equally to supply out-of-phase energy at X and Y. If, however, wave energy is applied to positions X and Y, these energies vectorially add at position A and subtract at position B.

For many years hybrid circuits have been employed for balancing in telephone repeater systems where the circuit takes the form of the well known hybrid coil or transformer and from this art the term hybrid originates. The term has been carried over into the ultra high frequency or microwave radio and radar art and throughout the literature references will be found to hybrid junctions an hybrid T's. For example, the hybrid T and its relation to the earlier form of hybrid transformer is explained at pages 7-11 to 7-13 in the Radio Engineers Handbook Heney—4th edition, McGraw Hill & Company, 1950. Examples of hybrid junction circuits will also be found at page 353 of Reference Data for Radio Engineers—3rd edition 1949, published by Federal Telephone & Radio Corporation. The term hybrid circuit as here employed is intended to designate a duplex balancer circuit which may be of either the wave guide junction type or the transformer circuit type.

Since the transmitter energy is coupled to position A, the pulses of wave energy are supplied by unit 13 in time phase to the antenna elements 15 and 16 of the antenna structure 14 while at the same time the transmitter energy is excluded from entering position B. The antenna elements 15 and 16, as here illustrated, are of the electromagnetic horn type and are similar structures mounted upon a support 17 which, as is indicated in the drawing, is rotatable in elevation about the center 18 and rotatable in azimuth about the axis 19. Also mounted upon support 17 is a telescope 20 for aiming a target and correspondingly sighting the antenna structure on the target.

The balanced terminal position B of the hybrid circuit 13 is coupled directly to the subtractive receiving channel 32 and the balanced terminal A is coupled via duplexer circuit 12 to the additive receiving channel 33. Subtractive channel 32 is comprised of converter unit 25, I. F. amplifier unit 26, detector unit 27 and video amplifier unit 28. The additive channel 33 is comprised of converter unit 21, I. F. amplifier unit 22, detector unit 23 and video coincidence amplifier unit 24. Common to both of these receiving channels is local oscillator unit 29 which is coupled to both converter units 21 and 25 in order to produce the conversion of radio frequency energy to intermediate frequency energy.

Video amplifier unit 28 of channel 32 is coupled to I. F. amplifier unit 22 and to coincidence video amplifier unit 24 of channel 33 to control the amplification of these units. The polarity of output potential from unit 28 is by design made negative so that it may operate in the manner of an automatic volume control upon amplifier units of the additive channel 33.

Unit 24 may be simply a video signal amplifier the gain of which varies inversely with the amplitude of the control potential from unit 28 but it is preferably arranged as a coincidence amplifier as labeled in the drawing. Coincidence amplifiers are well known in the art and in this instance it may be considered to be simply a vacuum tube amplifier supplied with operating potentials and bias potentials such that it will translate a signal to circuit 30 only when the negative control potential from unit 28 is at or closely approaches zero amplitude. The output of the coincidence video amplifier unit 24 is supplied to the range indicator unit 31 via range circuit unit 30. Unit 30, as has been mentioned, is synchronously controlled by timer 10, and ordinarily supplies a time base to indicator 31. It also supplies the pulse output of unit 24 to the indicator. The circuits that would ordinarily be employed in range unit 30 are of known form. For example, unit 30 may contain a sawtooth voltage generator to provide the time base, and indicator 31 may be, for example, the ordinary A scope display employed in conventional radar systems. However, range circuit 30, with indicator 31, may comprise more complex circuits for improving the precision of the range measurements.

Considering now the operation of the system and for explanation referring also to Figs. 2, 3 and 4, pulses of potential recurrent at a chosen repetition rate are supplied from timer 10 to the radio frequency pulse transmitter 11 to trigger that unit. Pulses of wave energy from unit 11 pass via duplexer 12 to hybrid circuit 13 at position A and because of the operation of the duplexer 12 they are prevented from entering converter 21. The conjugate relation in hybrid circuit 13 serves to prevent transmitter energy from entering converter 25 through position B. The transmitter energy is, however, translated by hybrid circuit 13 in substantially equal amplitude and in identical phase to the antenna elements 15 and 16.

The wave energy radiated and the echo energy received by each of the elements 15 and 16 of antenna structure 14 is preferably in a narrow conical pattern or lobe as illustrated in Fig. 2. In this figure the upper lobe 15' is shown in solid line and the lower lobe 16' is shown in dash line in both a plan and an elevation view. Fig. 3 shows in solid line a graph of these patterns or lobes of antenna elements 15 and 16 plotted against elevation angle in rectangular coordinates. This drawing is more complete than the illustration in Fig. 2 in that minor lobes are also included in the illustration. In dot-dash lines the sum of the two lobes is plotted and it is this sum directional pattern which corresponds to the directional pattern which is transmitted. In dotted line the difference of the lobes is indicated and, as will be more fully explained hereinafter, for reception both the sum and difference of the lobe amplitudes are utilized. It will be clear, therefore, from the description thus far given, that the elements of unit 14 comprise an antenna structure adjustable in direction which comprises the antenna elements 15 and 16 for transmitting and receiving wave energy in a pair of narrow conical patterns overlapping in elevation to provide a sight direction wherein the amplitudes of the patterns are equal and the telescope 20 attached to the support 17 comprises means for aiming at the antenna structure to cause the sight direction to intersect a chosen target. It will also be clear that transmitter 11 together with duplexer 12 and hybrid balancing circuit 13 comprise means for simultaneously transmitting in each of the directive patterns pulses of inphase wave energy of a chosen carrier frequency.

Fig. 4 curve A illustrates by solid lines the upper lobe 15' radiated from antenna structure 14 as it intersects the ground area where a target 34 is located in the line of sight. The range over which this pattern extends is thus indicated. In dash line the lower lobe 16' and its intersection with the ground is illustrated. It will be noted that the intersection of the two lobes, indicated by dot-dash line, intersects at target 34 and is labeled the line of sight. The term "bore sight" is also employed to indicate this line. In Fig. 4, curve B the overlapping directional patterns as they strike the ground are indicated in plan view. It will be evident that the intersection of the lobes is actually a plane, termed the "bore sight" plane, but the sum of the intensities of the directive patterns is maximum at the target location 34 so that effectively a line of sight is defined. As stated previously, the sighted target returns no echo response distinguishable over the clutter echo response of the area in which the target is located. It will therefore be clear that a sequence of echoes or echo pulses of wave energy is returned from the area over which the lobe patterns extend on the ground and that these echoes return to antenna structure 14 in time displacement corresponding to the range displacement of the points of their origin on the ground.

These return echoes are received by antenna elements 15 and 16 and supplied by them to hybrid junction circuit 13 at positions X and Y. The echo wave energies received at elements 15 and 16 which arrive from the line of sight direction are of equal amplitude and in time phase while the echo waves from other direction lines differs in amplitude in accordance with the directive lobe patterns of elements 15 and 16 and vary in phase in accordance with the angle of their arrival and the separation of the antenna elements. The received energies are therefore combined at hybrid circuit 13 additively at position A and subtractively at position B. The additively combined energies are coupled to duplexer 12 where they are prevented from entering transmitter 11 and are translated from 12 to converter 21 of the additive receiving channel 33. Converter 21 is also supplied with energy from beating oscillator 29 and converts the sum signal to intermediate frequency which is amplified in I. F. amplifier 22 and in turn detected by detector 23. The video output of detector 23 is then amplified by coincidence amplifier 24.

The subtractively combined energies from hybrid circuit 13 are supplied to converter 25 of subtractive channel 32 from position B. Energy from beating oscillator 29, also supplied to 25, serves to convert the received energy to intermediate frequency where it is amplified by I. F. amplifier 26, detected by unit 27 the output of which is applied to video amplifier unit 28. The output of video amplifier 28 is employed as a control potential and for this purpose is supplied in negative polarity to I. F. amplifier 22 and coincidence amplifier circuit 24 of the sum channel 33. It will be clear therefore that hybrid circuit 13 together with receiving channels 33 and 32 provide means for combining the energy received in each of the directive patterns additively in one channel to provide a signal and subtractively in another channel to provide a control potential together with means for amplifying the signal and means for utilizing the control potential inversely to vary the gain of the amplifying means.

This operation will be evident by considering curve C of Fig. 4. Here the clutter echo response is illustrated as it would be received in the sum channel 33, in the absence of a control potential from the difference channel 32. The curve is a plot of received echo amplitude plotted against range to correspond with curves A and B. The curve also illustrates the received echoes as they would appear on a conventional A type display scope. It will be evident from this curve that in the clutter echo response there is no particular echo which precisely defines range to the chosen target which has been sighted upon although there is a rise in the curve at the target's range. The curve D of Fig. 4 shows the video output echo response of unit 28 of subtractive channel 33 and it will be evident that the clutter echo response is zero for echoes originating at the target location. This zero indication at the range point corresponding to the target location may be utilized to determine the range. However, it is not ordinarily possible to see this point with great precision on the display scope and more precise indication is desirable. To provide a precise indication the present invention operates to use the output of the sum channel under control of the potential derived from the difference channel. The connections from video amplifier 28 to I. F. unit 22 and coincident video amplifier 24, as has been stated, control the amplification of these units inversely with amplitude of control potential output of unit 28. In other words, if the potential output from unit 28 is large the gain in I. F. amplifier 22 is low and the output of unit 24 is zero. However, it will be noted that in the precise range of the sighted target the output of the difference channel is zero so that for this range, and this range only, a pulse output is translated from coincidence circuit 30 as illustrated in curve E of Fig. 4. Thus curve E illustrates the display as it would appear on indicator 31 and it will be evident that the range of the sighted target is directly indicated on the range scale.

The single pulse output of amplifier 24 corresponding to the range of the sighted target is supplied via range circuit 30 to indicator 31. Unit 30 also as previously explained, supplies a time base or range scale to indicator 31 and constitutes, with unit 31, means for measuring the time of arrival of the translated echo to determine the range of the target.

Referring now to Fig. 5 there is shown in diagram partly schematic a practical embodiment of the preferred form of the invention corresponding to a part of Fig. 1. The arrangement here is a wave guide structure for microwave radio energy and elements corresponding to those illustrated in block form in Fig. 1 are similarly labeled. The arrangement here illustrated does not show the antenna structure comprising electromagnetic horns 15 and 16 as being separately orientable. Instead all of the arrangement which involves the wave guide elements is built as an integral wave guide structure. The entire arrangement may be made small and compact and mounted by means not illustrated to be oriented in azimuth and direction so that in effect all of the elements of Fig. 5, except the sum and difference receivers which translate intermediate and video frequencies, comprise a unit which can be adjusted in azimuth and in elevation. The magic-T type of hybrid junction circuit is indicated for unit 13 having two wave guide channels which correspond to positions A and B of Fig. 1. Crystal detector elements 21 and 22 are housed within a wave guide cavity to which channels A and B are connected and to which the beating oscillator 29 is also coupled. The transmitter 11 is here indicated as a magnetron which supplies in-phase energy to the electro-magnetic horns 15 and 16 and is prevented from passing transmitter energy into the receiving channels by means of the transmit-receive tube labeled TR which corresponds to a part of the duplexer unit 12 of Fig. 1. The anti-transmit-receive tube labeled ATR and designated as 12' also corresponds in this wave guide structure to a part of the duplexer unit 12 of Fig. 1. TR and ATR tubes are well known in the radar art and the operation will not be described here for that reason. The operation of the system as here illustrated corresponds directly to that described for the Fig. 1 arrangement and hence will not be repeated.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A radar system for measuring range to a sighted target, said target ordinarily having no radar echo responsive distinguishable over the clutter echo of the area of the target location, comprising an antenna structure adjustable in direction, said structure comprising means for transmitting and receiving wave energy in a pair of narrow conical patterns overlapping in elevation to define a sight direction wherein the amplitudes of said pattern are equal optical means for aiming said structure to cause said sight direction to intersect said target, means for simultaneously transmitting in each of said patterns pulses of in-phase wave energy of a chosen frequency at a regular repetition rate, means for simultaneously receiving in said patterns echo return wave energy pulses at said repetition in time displacements corresponding to the range displacements of the points of their origin, means comprising a wave guide hybrid circuit for combining the wave guide energy received in each of said patterns additively in one channel to provide a signal and subtractively in another channel to provide a control potential, and means for utilizing said control potential inversely to vary the amplitude of said signal substantially to translate an echo from only said sighted target and means for producing a time base concurrently at said repetition and means for displaying said translated echo on said time base to determine the range of said target.

References Cited in the file of this patent

UNITED STATES PATENTS

| Number | Name | Date |
| --- | --- | --- |
| 2,418,465 | Doba | Apr. 8, 1947 |
| 2,433,681 | Blumlein | Dec. 30, 1947 |
| 2,456,666 | Agate et al. | Dec. 21, 1948 |
| 2,459,481 | Wolff | Jan. 18, 1949 |
| 2,463,233 | Alexanderson | Mar. 1, 1949 |
| 2,467,361 | Blewett | Apr. 12, 1949 |
| 2,509,207 | Busignies | May 30, 1950 |
| 2,567,197 | Fox | Sept. 11, 1951 |

FOREIGN PATENTS

| Number | Country | Date |
| --- | --- | --- |
| 597,094 | Great Britain | Jan. 19, 1948 |
| 610,664 | Great Britain | Oct. 19, 1948 |